May 17, 1927. Re. 16,624

E. C. GLEDHILL

GRADER

Original Filed Aug. 28, 1923 6 Sheets-Sheet 1

Inventor
E. C. Gledhill

By Kenyon & Kenyon
Attorneys.

May 17, 1927. Re. 16,624

E. C. GLEDHILL

GRADER

Original Filed Aug. 28, 1923 6 Sheets-Sheet 2

Inventor
E. C. Gledhill
By Kenyon & Kenyon
Attorneys.

May 17, 1927. Re. 16,624

E. C. GLEDHILL

GRADER

Original Filed Aug. 28, 1923 6 Sheets-Sheet 3

Inventor
E. C. Gledhill

By Kenyon & Kenyon
Attorneys.

May 17, 1927. Re. 16,624

E. C. GLEDHILL

GRADER

Original Filed Aug. 28, 1923 6 Sheets-Sheet 4

Inventor
E. C. Gledhill
By Kenyon & Kenyon
Attorneys.

May 17, 1927. Re. 16,624

E. C. GLEDHILL

GRADER

Original Filed Aug. 28, 1923 6 Sheets-Sheet 5

Inventor
E.C.Gledhill

By Kenyon & Kenyon
Attorneys.

May 17, 1927.

E. C. GLEDHILL

GRADER

Original Filed Aug. 28, 1923 6 Sheets-Sheet 6

Re. 16,624

Inventor
E. C. Gledhill

By his Attorneys
Kenyon & Kenyon

Reissued May 17, 1927. Re. 16,624

UNITED STATES PATENT OFFICE.

EDWARD C. GLEDHILL, OF GALION, OHIO.

GRADER.

Original No. 1,528,325, dated March 3, 1925, Serial No. 659,763, filed August 28, 1923. Application for reissue filed April 30, 1926. Serial No. 105,878.

This invention relates to graders, and has for an object a road grader in which the scraper blade may be positioned at the side of the grader to grade banks or slopes, as well as supported in different positions for road grading, and one in which the means for adjusting the scraper blade to various positions embody improvements over the means heretofore known. This object and other objects which will appear incidentally in the course of the following description are attained in such an apparatus as illustrated in the accompanying drawings, and the invention resides in certain novel features which will be particularly pointed out in the appended claims.

Figures 1, 10:
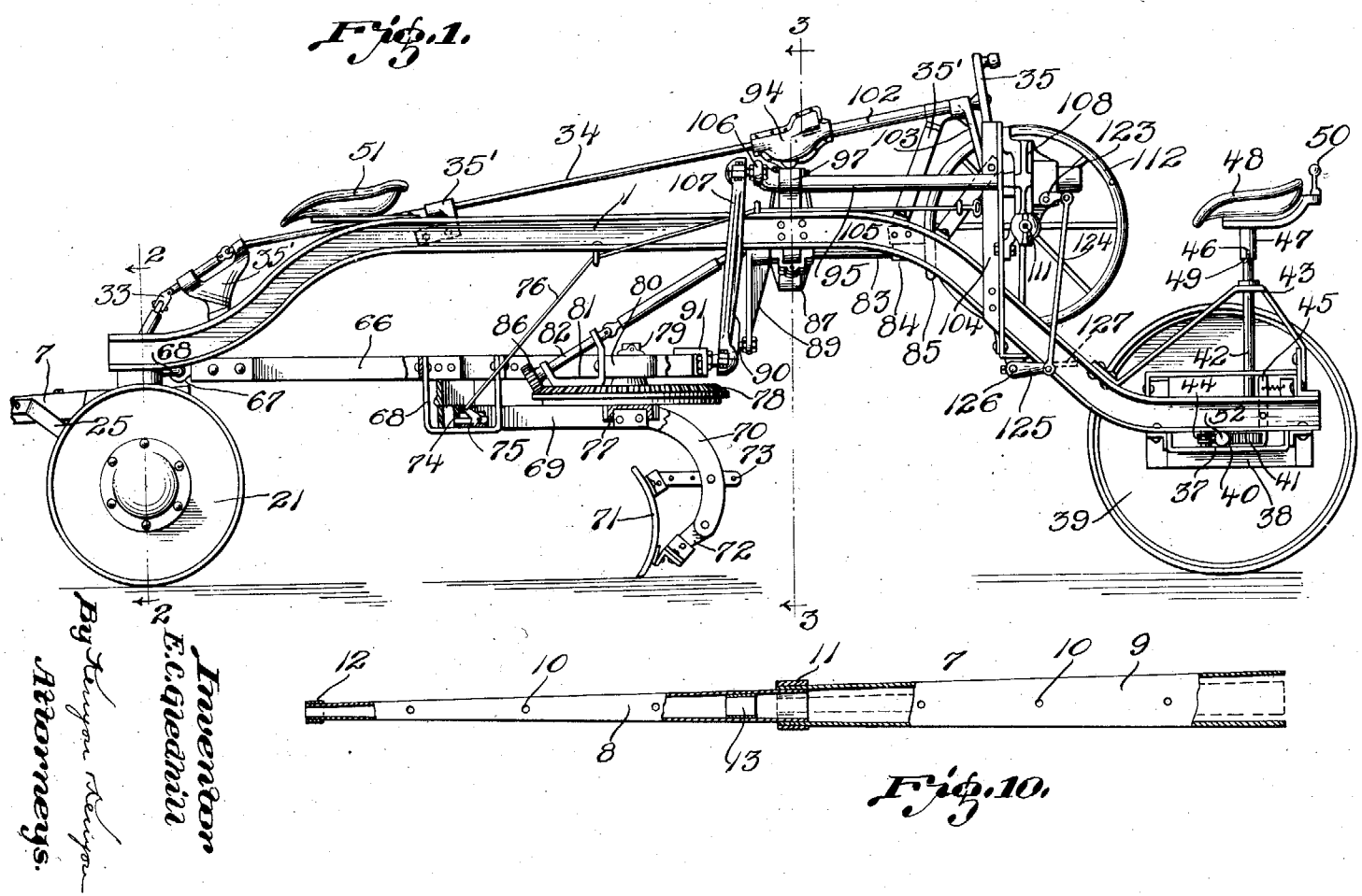
Figure 1 is a side elevation, partly in section, of a road grader constructed in accordance with my present invention.
Fig. 10 is a plan view, partly broken away and in section, of the tongue or draft pole.

The main frame of the machine comprises frame bars 1 which are preferably of I-beam construction and have their front ends connected by a cross-beam 2 and supported by the fifth wheel 3 of the front truck. This fifth wheel is an open circular frame having a diametrical bracing bar 4, which is normally disposed transversely of the machine, and a radial forwardly projecting bracing bar 5 which connects the bar 4 with the circular rim or body of the fifth wheel at the front of said bar 4. On the front side of the fifth wheel, aligned with the said bracing bar 5, is a socket or arm 6 to which the rear end of the draft pole 7 is secured. The draft pole or tongue consists of two inverted U-shaped members which taper toward their forward ends, the forward member 8 being adapted to be housed within the rear member 9 and be secured thereto whether in its retracted or projected position by suitable bolts passed through openings 10 provided therefor in the respective sections. A reinforcing band 11 is secured to the front end of the rear section externally thereof by welding or other preferred means, and a similar band 12 is secured in a similar manner around the front end of the forward section. The forward section is also provided internally near its rear end with a similar band 13. When the machine is to be drawn by draft animals, the tongue or pole is extended, as shown in Fig. 10, and whiffletrees and neck yokes will be mounted thereon in the usual manner. The tongue will be strong enough to resist all the strains to which it is subjected in use and at the same time will be light so that no excessive strain is imposed upon the draft animals. If the machine is to be drawn by a tractor, the front section of the tongue is retracted so as to be housed in the rear section and the length of the pole is thereby decreased so that it may be coupled to a tractor and the draft applied directly to the grader. The fifth wheel is further constructed at diametrically opposite points, aligned with the brace bar 4 with depending webs or feet 14 to which are secured the upper ends of the standards 15 which have their lower ends secured upon the upper side of the front axle 16.

To the under side of the axle 16, I secure brackets 17 having outwardly projecting vertically spaced lugs or ears 18 between which are received the hubs 19 of the spindles 20 upon which the front wheels 21 are mounted. Projecting rearwardly from the hubs 19 are spindle arms 22, and the spindle arms at the two sides of the machine are connected by a rod or link 23 whereby equal and simultaneous movement will be imparted to the arms if either one be actuated. A pivot bolt 24 is inserted vertically through the lugs or projections 18 and the hubs 19 fitted therebetween whereby the hubs and the spindles will be permitted to move pivotally relative to the brackets 17, as will be readily understood. Braces 25 extend between and are secured to the draft pole or tongue and the axle so as to brace the same and insure a quick response of the axle to lateral movement of the tongue in steering the machine.

Figure 2:
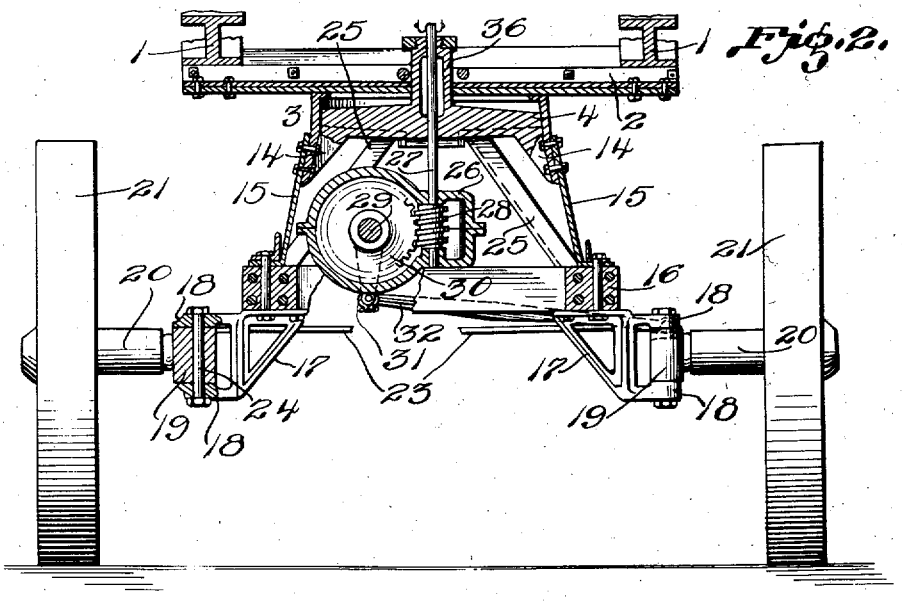
Fig. 2 is a transverse section on the line 2—2 of Fig. 1.

Secured upon the axle is a gear casing 26 and journaled in the top and bottom of this gear casing is a vertical shaft 27 provided within the casing with a worm 28. A worm shaft 29 is also journaled in the front and rear walls of this casing at one side of the shaft 27 and carries a worm gear 30 meshing with the worm 28, as shown clearly in Fig. 2. One end of the shaft 29 projects through the adjacent end wall of the gear casing and is equipped with a crank 31 to the lower end of which is pivoted a link 32 having its outer end pivoted to the end of one spindle arm 22. The pivotal connections between the link 32 and the parts to which it is attached are preferably in the form of ball and socket joints so that there will be no binding of the parts in operation and the parts will move relative to each other freely and easily. To the upper end of the vertical shaft 27, I secure one end of a flexible coupling 33 which connects the said shaft with an operating shaft 34 extending rearwardly over the main frame and equipped at its rear end with a hand wheel 35 which may be readily reached by an operator upon the rear platform. The shaft 34 is supported in suitable brackets 35′ disposed at convenient points upon the main frame so that bending of the shaft will be avoided and it will be maintained in an operative condition at all times. The turntable 3 is provided centrally with a hub or hollow post 36 through which the shaft 27 extends, and which, in turn, extends through the front cross bar 2 of the main frame, the turntable being thereby caused to support the front end of the main frame and at the same time being capable of pivotal movement with respect thereto. Inasmuch as the shaft 27 is concentric with the hub 36, the pivotal turning movement of the fifth wheel or turntable will carry the gear casing 26 around the shaft 27 as a center without disturbing the relation between the worm 28 and the worm gear 30. If it be desired to carry the machine around a corner or to reverse its travel, the front truck is permitted to turn in the usual manner so that the course of the machine will be changed. If, however, it is found advantageous to permit the tractor or the draft animals to travel at one side of the path of the machine, the tongue or draft pole is disposed in the proper angular relation to the main frame and the axle will, of course, turn correspondingly and remain at a right angle to the tongue. The operator upon the rear platform will by properly turning the hand wheel 35, rotate the shaft 34 and the shaft 27 so that the crank 31 will be rocked, through the described gearing, and the rocking movement of the crank will be transmitted through the link 32 to the attached spindle arm 22 and the connecting rod 23 will cause the mating spindle arm to follow the movement. The wheels 21 may thus be brought into parallelism with the central longitudinal line of the machine and the grader thereby caused to follow a straight path even though the draft be applied from a point at one side. Obviously, the wheels will be disposed one in advance of the other and the forward wheel, of course, be in the ditch of the road so that it will be disposed in advance of the blade instead of being brought closer to the forward end of the blade, as is now the general condition, and the tendency of the machine to move sidewise or skid will thus be counteracted and overcome. The operator is thus enabled to keep the machine in the desired path more easily than is possible with any other machines now known to me.

The rear ends of the main frame bars 1 are supported by the axle 37 and a lower retaining frame 38 is secured to the under side of the frame bars so that relative vertical movement of the frame and the axle is prevented. Ground wheels 39 are mounted upon the ends of the rear axle and upon the rear side of the said axle is formed a rack bar 40 with which meshes a pinion 41 secured upon the lower end of a vertical shaft 42 which is journaled in a suitable bearing on the main frame and is maintained in an upright position against binding by a bracket 43 secured on the upper side of the frame. A roller 44 is mounted upon the main frame and bears against the front side of the rear axle 37 so that the engagement between the pinion 41 and the rack bar 40 will be maintained. A latch 45 is mounted upon the frame in rear of the pinion 41 and normally engages said pinion so that it will be locked against rotation and the frame, consequently, held in any position relative to the axle in which it may be set. Near its upper end, the shaft 42 is provided with one or more pins 46 and a sleeve 47 depends from the seat 48 to fit over the upper end of the said shaft, the lower end of said sleeve or socket being provided with notches 49 adapted to engage the pins 46 and thereby prevent relative rotation of the sleeve and the seat. A handle 50 of any convenient or preferred form is provided at the back of the seat 48 so that with the parts arranged as shown in Fig. 1, the shaft 42 may be rotated by properly manipulating the said handle. Rotation of the shaft 42 will, of course, cause the pinion 41 to ride longitudinally of the rack 40 and the rear end of the main frame will, consequently, be shifted laterally upon the axle so that the rear wheels and the main frame may be set in any desired relation as the work may demand. It will, of course, be understood that, prior to rotation of the shaft 42, the latch 45 is released and, when the main frame has been shifted sidewise to the desired extent, the latch is permitted to again engage the pinion so as to hold the parts in the position in which they are set. Should the rotation of the shaft 42 be arrested with the seat 48 facing backwardly or to one side, the seat is merely lifted so that the sleeve or socket 47 will clear the pins 46, after which it is turned so as to face forwardly and then lowered to again engage the said pins 46. I thus provide in one structure a seat for the operator and also a means for adjusting the main frame laterally. A seat 51 for the driver may be mounted upon the main frame at any convenient point thereof near the front end of the same.

Figure 9:
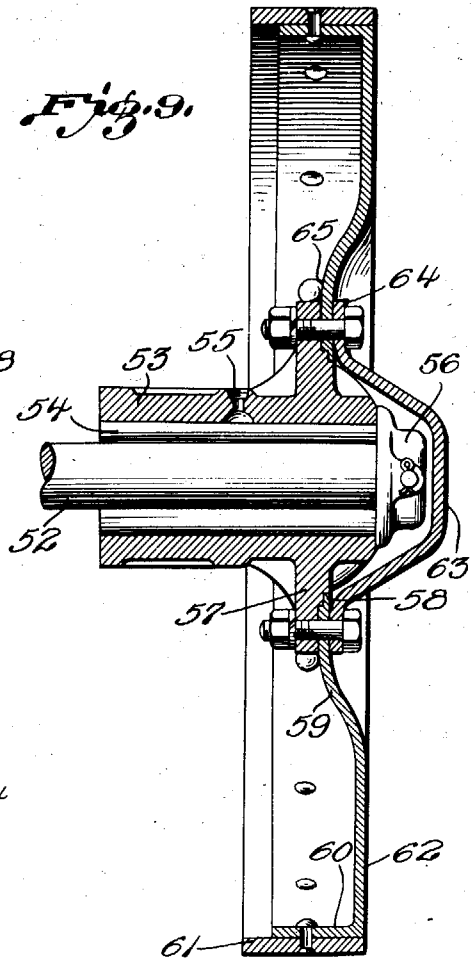
Fig. 9 is an enlarged section through one of the wheels.
Figure 8:
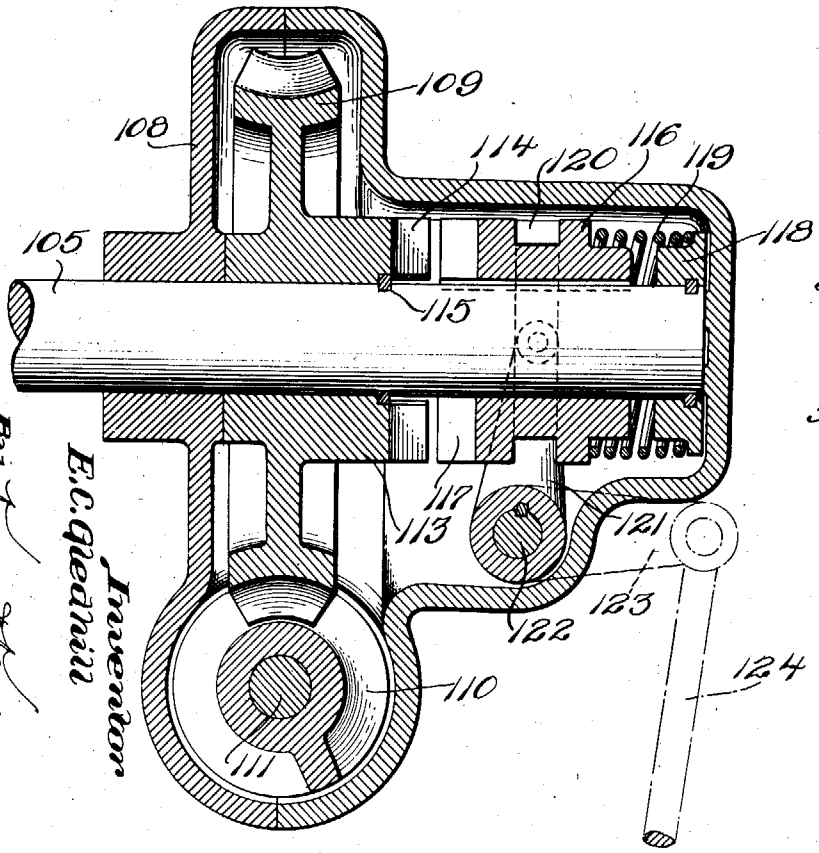
Fig. 8 is an enlarged section taken longitudinally through a portion of the gearing whereby the position of the blade is controlled.
Figure 11:
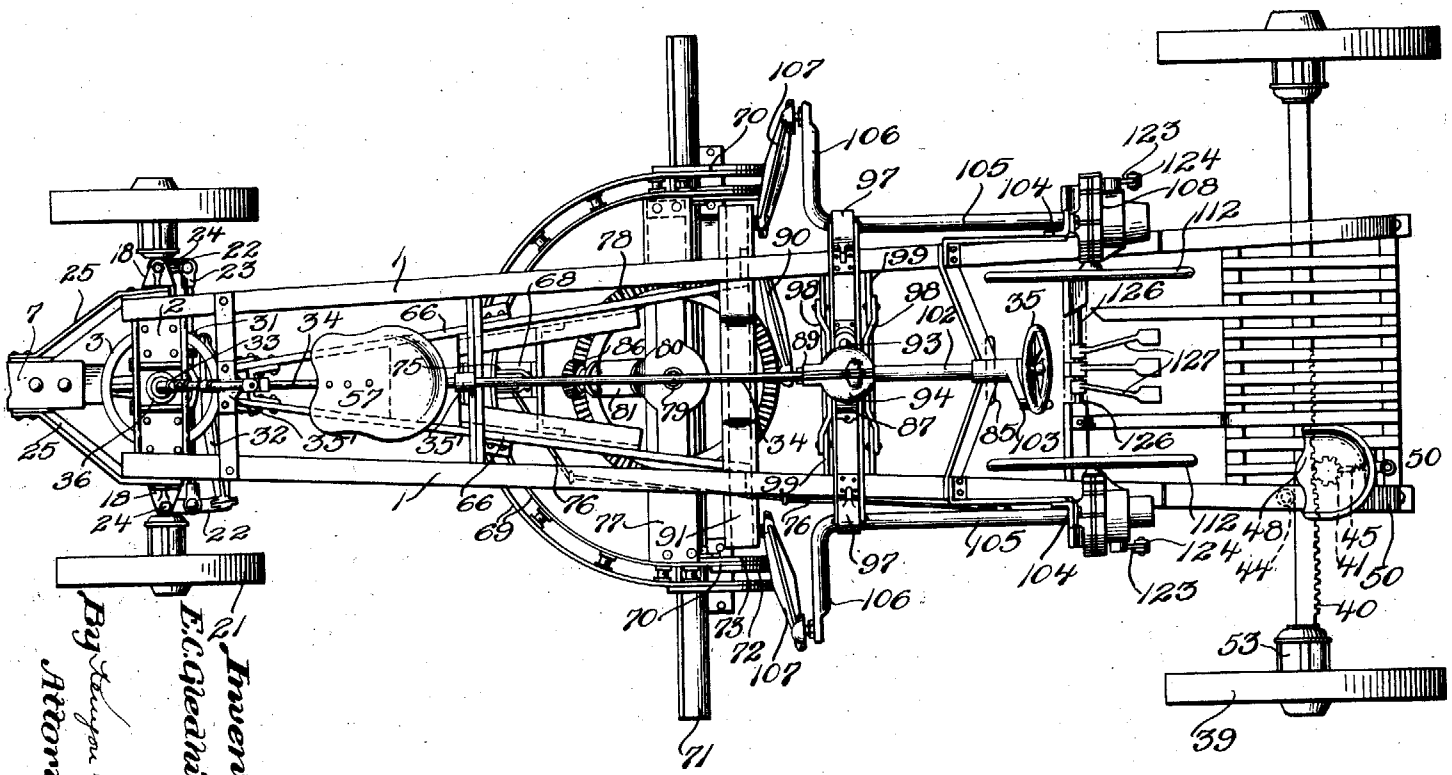
Fig. 11 is a plan view of the entire machine.

The rear axle 37 is provided at both ends with spindles or bearing portions 52 of circular cross section and the hubs 53 of the rear wheels are engaged over the said spindles, anti-friction rollers 54 being preferably fitted between the spindles and the inner circumference of the hubs, as will be readily understood. Oil guides or openings 55 may be provided in the hubs as is obvious so that lubricant may be supplied to the roller bearings and free rotation of the wheels obtained. A retaining nut 56 is secured to the outer end of the spindle 52 and extends over the outer end of the hub so as to close the same and retain the rollers therein. Adjacent its outer end, the hub is provided with an annular flange 57 having its outer face rabbeted, as shown at 58, and the inner circular edge of a disk 59 seats in the said rabbeted portion, as clearly shown in Fig. 9. This disk is a metal plate provided at its outer edge with an annular flange 60 which is rigidly secured to the rim or tread 61 of the wheel and the intermediate portion 62 of the disk or plate is so disposed as to be flush with the outer edge of the rim or tread, as clearly shown in Fig. 9. A hub cap 63 is arranged over the retaining nut 56 and has its edge portion turned outwardly to bear against the outer face of the disk 62 at the inner edge thereof, as shown at 64, while securing bolts 65 are inserted through the hub flange 57, the inner edge portion of the disk and the outer edge portion 64 of the hub cap to secure all the parts together. The front wheels 21 are of the same construction as that just described and specifically stated to be embodied in the rear wheels and this construction is advantageous in the machines of this class.

When a road grader is at work, the wheels on one side are running in the ditch or gutter side of the road, while the wheels at the opposite side of the machine are running in a higher plane or on the crown of the road. Obviously, a greater strain or weight is imposed upon the lower wheels, and with the usual construction the wheels embodying a plurality of separated spokes, the wheels are forced against the bank of the ditch or gutter so that the edge of the rim or tire cuts into the bank and the spokes exaggerate the cutting away of the bank which is started by the rim or tire. In my present machine, however, by providing a wheel of a disk or closed type and having the greater portion of the disk flush with the outer edge of the tire or tread member of the wheel, I avoid the presentation of relatively narrow or sharp members to the bank of the ditch so that the digging or cutting away of the same is avoided, and, instead of such action, the wheel has a troweling effect so that the wall of the ditch is made firm and smooth.

The draw bars 66 of the machine are disposed below the main frame bars 1 and are provided at their front ends with an eye 67 engaged in a hook or eye 68′ carried by the cross bar 2 of the main frame, the said drawbars being thus swiveled to the main frame so that they may be shifted sidewise or raised and lowered readily as may be necessary. A bracket 68 is secured to and depends from the drawbars 66 at an intermediate point of the length thereof, and this bracket may be of any preferred form which will provide an open support and guide for the semicircular connecting member 69 for the beams 70 which carry the blade 71. The blade 71 is of the usual dished formation and it may be connected with the beams 70 in any desired manner. I have illustrated the blade as having a link or pivotal connection 72 between its lower edge portion and the lower ends of the beams 70, while between the said beams and the upper portion of the blade an adjustable connecting bar 73 extends. This arrangement permits the blade to be set so that its upper portion will overhang its lower cutting edge portion if so desired or to be withdrawn so that the dirt loosened and raised by the lower edge of the blade may ride up the same and escape over the top edge of the same. If the upper edge be set to overhang the lower edge, the loose dirt will be turned back onto the surface of the road and will be worked into the hollow portions of the same so that a smooth surface will be formed by the travel of the machine. The member 69 is provided with a plurality of openings, indicated at 74, and a latch 75 is mounted upon the bracket 68 to engage in one of said openings and thereby hold the member in a set position, the angular position of the blade relative to the line of draft being determined by the position in which the member 69 is set. The latch 75 may be of any preferred construction and may be operated in any desired manner, but I have indicated a cable 76 attached to the latch and extending upwardly therefrom to the main frame and then rearwardly on the main frame to the rear of the machine so that it may be manipulated by an operator upon the rear platform or in the seat 48. This arrangement is very convenient but it may be varied in detail as may be preferred. A cross bar 77 is secured rigidly to the beams 70 and bridges the same and upon this cross bar I form or rigidly secure a horizontally disposed beveled gear wheel 78, the hub 79 of the wheel extending upwardly through a suitable bearing carried by the draw bars 66. Secured to the front side of the said bearing, indicated at 80, is a guide bracket 81 in which is mounted the front section 82 of a flexible shaft, the rear section of which 83, is journaled at its rear end in a bearing 84 upon the main frame, and is equipped with a hand-wheel 85. Upon the front end of the shaft section 82 is a pinion 86 which meshes with the gear wheel 78, as clearly shown in Fig. 1. It will be readily understood that, by properly rotating the hand-wheel 85, the flexible shaft will be rotated and the pinion 86 will transmit the rotation to the gear 78 so that said gear will rotate in a horizontal plane about its hub 79, and inasmuch as the gear is rigid with the bar 77 and the beams 70, the entire blade supporting structure will be turned about the same center and the blade thus brought into any desired angular position. When the proper position of the blade has been attained, the latch 75 will be released and will re-engage the member 69 so as to lock the parts in set position. It will, of course, be readily understood that by properly turning the flexible or sectional shaft and the gear 78, the blade 71 may be set to turn the dirt to either side of the machine.

Figure 4:
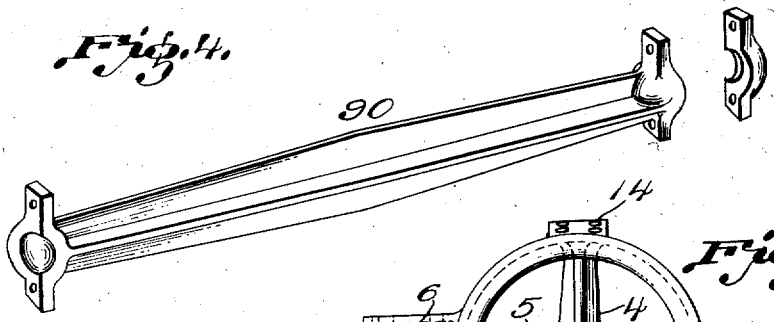
Fig. 4 is a detail perspective view showing the construction of one of the lifting arms.
Figure 5:
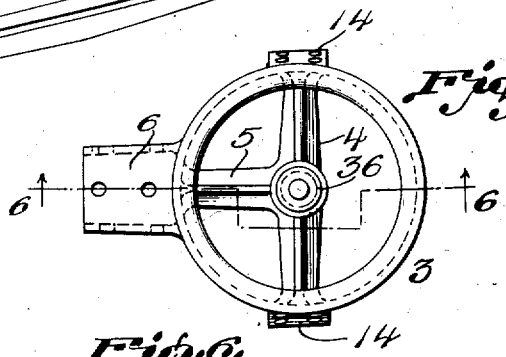
Fig. 5 is a detail plan view of the fifth wheel employed in the front truck.
Figure 7:
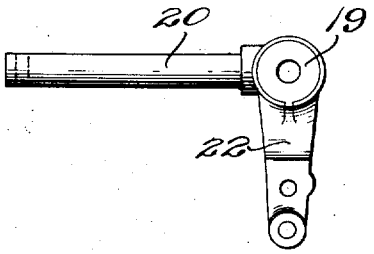
Fig. 7 is a plan view of one of the spindles carrying the front wheels of the truck.
Figure 6:
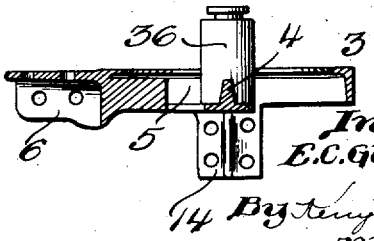
Fig. 6 is a section thereof on the line 6—6 of Fig. 5.

A gear casing 87 is fitted about the shaft section 83, and a worm gear 88 is loosely mounted upon the shaft within said gear casing, the hub of the said worm gear being projected through the front side of the gear casing and secured to a crank 89 which has its lower end connected to a link bar 90, the outer end of the said link bar being attached to a cross bar 91 which is carried by the rear ends of the draw bars 66. The said link bar 90 is shown in detail in Fig. 4, and it will be noted that it is of a cruciform cross section so that it possesses great strength with minimum weight and its ends are so constructed that they constitute sockets to engage with balls provided on the cross bar 91 and at the end of the crank 89 respectively, so that there will be no binding of any of the parts when they are to operate. A worm 92 is in constant mesh with the worm gear 88, and this worm is disposed within an offset portion of the gear case 87 and is fixed to the lower end of a shaft 93 which is journaled in the offset portion of the gear case and rises therefrom to pass into another gear case 94 fitted about the steering rod 34 and supported by a bracket 95 secured to and rising from cross bars 96 extending between the bearing brackets 97 secured upon the main frame bars 1 and reinforced centrally by arched brackets 98 secured to and rising from bridge pieces 99 secured to and extending between the main frame bars. Within the gear case 94, a bevel gear 100 is secured upon the upper end of the shaft 93, and this beveled gear meshes with a pinion 101 formed on or secured to the front end of a hollow shaft 102 which is fitted about the steering rod or shaft 34 and is provided at its rear end with a crank handle 103 arranged adjacent the hand wheel 35. By manipulating the crank 103, motion will be imparted through the described train of gearing and co-operating elements to rock the crank 89 so that endwise movement will be imparted to the link bar 90 and the sidewise shifting of the blade-supporting structure will result. It will be readily understood that the link bar 90 acts directly upon the cross bar 91 and, as this bar is secured rigidly to the drawbars 66 and the blade-carrying structure is connected with the said drawbars, the entire blade and the frame carrying it will be shifted sidewise relative to the main frame and the blade thus brought into the desired bevel.

Figure 3:
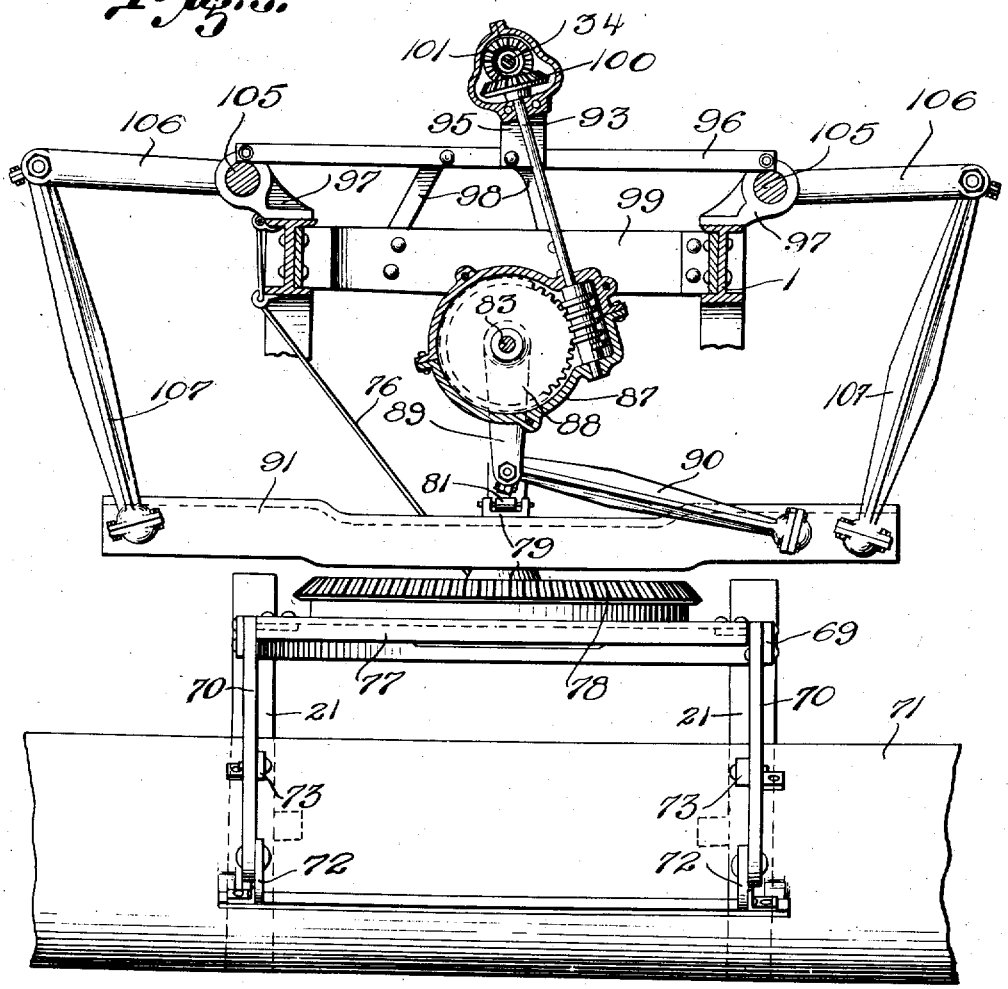
Fig. 3 is a transverse section on the line 3—3 of Fig. 1.

Mounted in each bearing 97 and in a bearing provided therefor upon a standard 104 secured to and rising from the proper main frame bar is a rock shaft 105, each of said shafts having its front end formed into a crank 106 which is normally arranged to extend laterally, as shown most clearly in Fig. 3. A link bar 107 is provided at each side of the machine to connect the outer free end of the respective crank 106 with the subjacent end of the cross bar 91, and these links 107 are of the same construction as the link bar 90 and the link 32. It will be readily understood that, if either shaft 105 be rocked, the corresponding link bar 107 will be caused to move upwardly or downwardly and will, therefore, raise or lower the end of the bar 91 to which it is attached so that the blade and the blade-carrying structure will be tilted and thereby set to the pitch desired for the finished road. Either shaft 105 may be rocked independently by rotation of the hand wheel 112 through the medium of suitable gearing contained within a gear case 108 supported on the adjacent standard 104. The blade 71 may be lifted clear of the road by properly rotating both hand wheels 112 or it may be set at any desired angle in a vertical plane by different operation of the hand wheels 112. As it may be desirable not to have the shaft 105 geared to the wheel 112 at all times, there may be loosely mounted on the shaft within said gear case a worm gear wheel 109 which meshes with a worm 110 mounted in the lower portion of the gear case and carried by a shaft 111 which is disposed transversely of the machine, the hand wheel 112 being secured upon the outer end of said shaft as will be readily understood. The hub 113 of the worm gear 109 is constructed with a clutch face 114 at its rear end, and a retaining ring 115 is fitted to the shaft 105 at the rear end of the hub so as to prevent movement of the hub and the gear longitudinally of the shaft.

A clutch sleeve 116 is slidably mounted upon the shaft 105 but is constrained to rotate therewith and is constructed with a clutch face 117 at its front end mating and adapted to engage with the clutch face 114 on the hub 113. A collar or abutment 118 is secured upon the end of the shaft 105 within the gear case, and a spring 119 is coiled about the shaft between the clutch sleeve and the said abutment or collar and tends constantly to expand, and, by its expansion, hold the clutch sleeve in engagement with the clutch hub. The clutch sleeve is provided between its ends with an annular groove 120 which is engaged by the ends of a fork 121 carried by a rocking pivot or shaft 122, and upon the outer end of the said rocking pivot or shaft is secured a short crank 123. The crank 123 projects rearwardly from the gear case, and a link 124 is pivoted at its upper end to the free end of said crank, the lower end of the link being pivoted to a similar crank 125 on a pedal shaft 126 mounted in suitable bearings upon the main frame and equipped with a pedal 127 which may be operated by the foot of the operator in the seat 48. If the pedal 127 be released, the spring 119 will expand and the clutch 116 will be thereby thrown into engagement with the clutch hub 113 so that the worm gear 109 will be locked to the shaft 105. If the hand wheel 112 be then rotated, the motion will be imparted through the described gearing to the shaft 105 and the crank 106 may be caused to swing upwardly so as to exert a lifting force through the lifting link bar 107 and thereby raise the blade. By depressing one of the pedals, the clutch will be withdrawn from the clutch hub and no rotation will be imparted to the shaft 105 by the roller gearing, but said shaft will be free to rock in the opposite direction under the influence of the weight of the blade and the structure carrying the same so that one end of the blade may be permitted to drop at the same time that the other end thereof is being raised or held stationary. It will be readily understood that the worm gearing at the two sides of the machine are opposed so that the rock shafts actuated by them will turn in opposite directions. If, therefore, both clutches be engaged and the hand wheels 112 rotated in the proper direction, the blade may be lifted clear of the road so that the machine may be driven to another point of use and will remain inoperative during transit, the clutches in conjunction with the worm gearing acting as brakes to prevent the reverse rotation of the shaft 105 and the consequent lowering of the blade.

Figure 12:
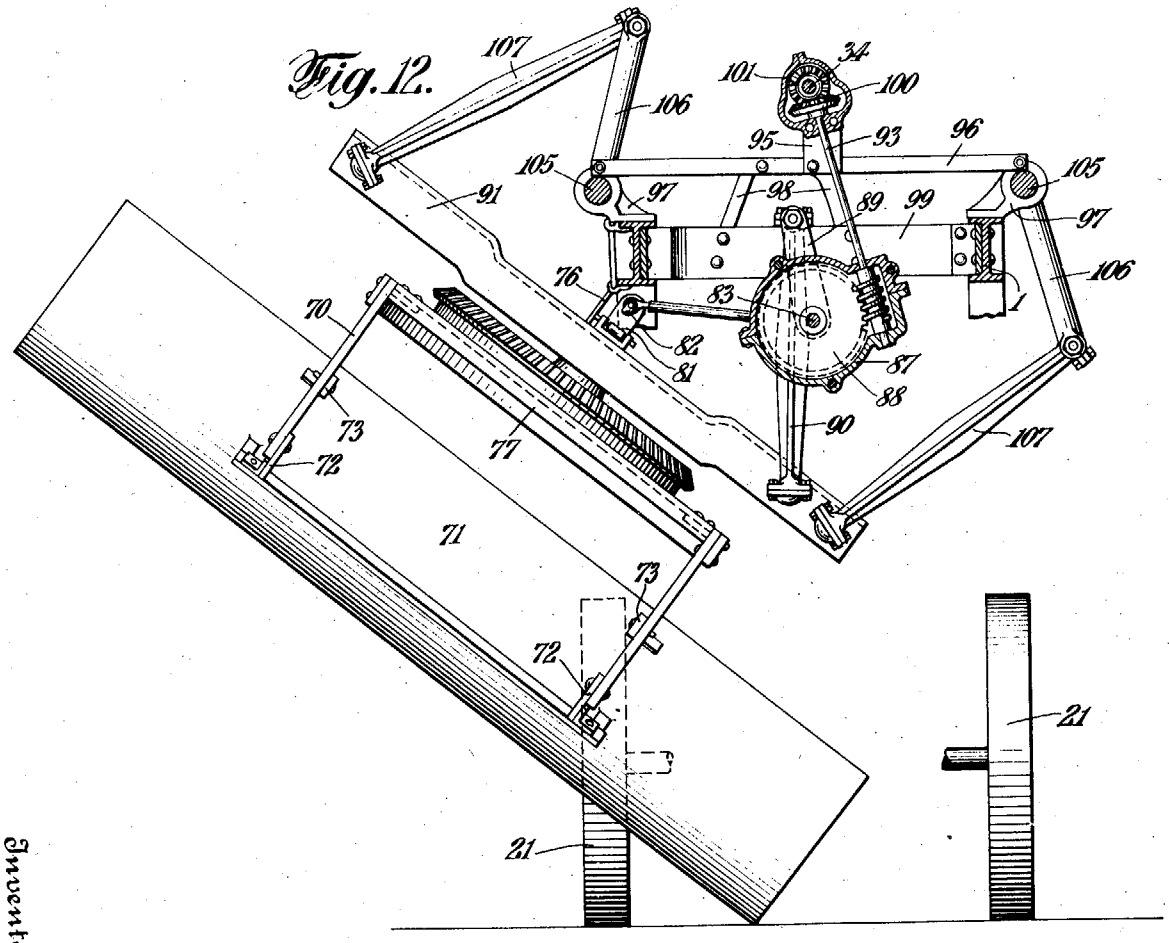
Fig. 12 is a view similar to Fig. 3 but with the blade presented in an inclined position laterally of the vehicle.

With the above described construction the blade 71 may not only be arranged in a number of different positions for road scraping but may also be arranged at the side of the vehicle to grade a bank or slope as shown in Fig. 12. To bring the blade 71 in position to grade a bank, the shaft 102 is so rotated as to swing the crank 89 in clockwise direction (see Figs. 3 and 12) thereby moving the rear end of the blade supporting frame laterally of the vehicle. At the same time the shafts 105 may be rotated to permit the links 107 to move with the blade frame. After the rear end of the frame has been moved laterally of the vehicle further rotation of the crank arm 89 produces an upward pull on the frame. At this time the crank arms 106 are properly manipulated to cooperate with the link 90 in lifting the frame so that the blade is clear of the ground. In this position the frame is pivotally supported by the link 90 and rotation of the shafts 105 in a clockwise direction elevates the left end of the blade 71 and depresses the right end thereof to present the blade in an inclined position for use in grading a slope. The fact that the blade has been lifted slightly before being tilted prevents the lower right hand corner of the blade from digging into the ground as the blade is swung into position. The link 90 in addition to pivotally supporting the frame while the blade is being brought into inclined position also assists in supporting the blade in such position after having been so arranged. With the blade in the position shown in Fig. 12, the grader may be used to grade a bank or slope. The inclination of the blade 71 may be increased over that shown in Fig. 2 by further rotation of the shafts 105. In returning the blade to normal position, it is swung about the lower end of the link 90 as a pivot and is thus brought into horizontal position.

The crank 89 is then rotated counter-clockwise and the crank arms 105 suitably rotated to permit the blade to descend into contact with the ground after which further rotation of the crank arm 89 is effective to restore the frame to central position.

From the foregoing description, taken in connection with the accompanying drawings, it will be seen that I have provided a road grader of simple and inexpensive construction which may be very easily set to operate at any desired depth or angle and which will be very strong and durable and highly efficient in use.

What I claim as new and desire to secure by Letters Patent is:

1. A road grader comprising a vehicle, a frame loosely connected at its front end to said vehicle, a blade carried by said frame, vertically adjustable members mounted on said vehicle, links connecting said members and the rear end of said frame and means for moving the rear end of said frame laterally of said vehicle and pivotally supporting said frame when laterally moved whereby opposite adjustment of said members is effective to present said blade laterally of said vehicle in an inclined position for use in grading a slope.

2. A road grader comprising a vehicle, a frame loosely connected at its front end to said vehicle, a blade carried by said frame, crank arms mounted on said vehicle, links connecting the ends of said crank arms and the rear end of said frame and means for moving the rear end of said frame laterally of said vehicle and pivotally supporting said frame when laterally moved whereby rotation of said crank arms in the same direction is effective to present said blade laterally of said vehicle in an inclined position for use in grading a slope.

3. A road grader comprising a vehicle, a frame loosely connected at its front end to said vehicle, a blade carried by said frame, vertically adjustable members mounted on said vehicle, links connecting said members and the rear end of said frame and means including a crank arm rotatable about a horizontal axis for moving the rear end of said frame laterally of said vehicle and pivotally supporting said frame when laterally moved whereby opposite adjustment of said members is effective to present said blade laterally of said vehicle in an inclined position for use in grading a slope.

4. A road grader comprising a vehicle, a frame loosely connected at its front end to said vehicle, a blade carried by said frame, crank arms mounted on said vehicle, links connecting the ends of said crank arms and the rear end of said frame and means including a crank arm rotatable about a horizontal axis for moving the rear end of said frame and pivotally supporting said frame when laterally moved whereby rotation of said crank arms in the same direction is effective to present said blade laterally of said vehicle in an inclined position for use in grading a slope.

5. A road grader comprising a vehicle, a frame loosely connected at its front end to said vehicle, a blade carried by said frame, vertically adjustable members mounted on said vehicle, links connecting said members and the rear end of said frame and means including a crank arm rotatable about a horizontal axis and a link connecting the end of said crank arm and said frame for moving the rear end of said frame and pivotally supporting said frame when laterally moved whereby opposite adjustment of said members is effective to present said blade laterally of said vehicle in an inclined position for use in grading a slope.

6. A road grader comprising a vehicle, a frame loosely connected at its front end to said vehicle, a blade carried by said frame, crank arms mounted on said vehicle, links connecting the ends of said crank arms and the rear end of said frame and means including a crank arm rotatable about a horizontal axis and a link connecting the end of said crank arm and said frame for moving the rear end of said frame laterally of said vehicle and pivotally supporting said frame when laterally moved whereby rotation of said crank arms in the same direction is effective to present said blade laterally of said vehicle in an inclined position for use in grading a slope.

7. A grader comprising a vehicle having longitudinal beams, a frame loosely connected at its front end to the vehicle, a blade carried by said frame, crank arms mounted on said vehicle for rotation about horizontal axes, the ends of said crank arms being arranged to project below said beams, links connecting the ends of said crank arms and the rear end of said frame and means for moving the rear end of said frame laterally of said vehicle and pivotally supporting said frame when laterally moved whereby opposite adjustment of said members is effective to present said blade laterally of said vehicle in an inclined position for use in grading a slope.

8. A road grader comprising a vehicle, a frame loosely connected at its front end to said vehicle, a blade carried by said frame, vertically adjustable members mounted on said vehicle, connecting means between said members and the rear end of said frame, and means for moving the rear end of said frame laterally of said vehicle and pivotally supporting said frame when laterally moved whereby opposite adjustment of said members is effective to present said blade laterally of said vehicle in an inclined position for use in grading a slope.

9. A grader comprising a vehicle having longitudinal beams, a frame loosely connected at its front end to the vehicle, a blade carried by said frame, crank arms mounted on said vehicle for rotation about horizontal axes, the ends of said crank arms being arranged to project below said beams, links connecting the ends of said crank arms and the rear end of said frame, and means including a crank arm rotatable about a horizontal axis and a link connecting the end of said crank arm and frame for moving the rear end of said frame laterally of said vehicle and pivotally supporting said frame when laterally moved whereby opposite adjustment of said members is effective to present said blade laterally of said vehicle in an inclined position for use in grading a slope.

10. In a road grader, the combination of a main frame, drawbars connected at their front ends with the main frame for free relative movement, a blade carried by the drawbars, rock shafts mounted on the frame at the sides thereof, connections between said rock shafts and the drawbars whereby to raise or lower the blade, shafts mounted upon the main frame transversely thereto adjacent the rear ends of said rock shafts, operative connections between said transverse shafts and the rock shafts including gears loose on the respective rock shafts, clutch members mounted upon the rock shafts and adapted to lock said gears thereto, means for normally holding the clutches in engagement with the gears, and means for releasing the clutches from the respective gears at will.

11. The combination of a main frame, drawbars supported at their front ends upon the main frame for free movement, a blade carried by the rear ends of the drawbars, means on the sides of the main frame to support the drawbars for swinging movement whereby to effect vertical adjustment of either end of the blade, a crank mounted on the main frame between the sides of the same for swinging movement in a vertical plane, a link connecting said crank with the drawbars, and means for actuating said crank to move said drawbars laterally of the main frame and pivotally support said drawbars when so moved whereby adjustment of said drawbar supporting means is effective to present said blade laterally of said main frame in an inclined position for use in grading a slope.

12. The combination of a main frame, drawbars supported at their front ends upon the main frame for free movement, a blade carried by the rear ends of the drawbars, means on the sides of the main frame to support the drawbars for swinging movement whereby to effect vertical adjustment of either end of the blade, a shaft mounted on the bottom of the main frame, a crank on said shaft arranged for movement in a transverse vertical plane of the main frame, a worm gear on said shaft, a worm meshing with said worm gear, a shaft carrying said worm and rising through the main frame, and gearing mounted on the top of the main frome for rotating the last-mentioned shaft.

13. The combination of a main frame, drawbars supported at their front ends upon the main frame for free movement, a blade carried by the rear ends of the drawbars, longitudinally extending rock shafts mounted directly on the main frame at the sides of the same, cranks on said shafts adapted to swing below the main frame, links connecting said cranks with the drawbars, a longitudinally extending rock shaft mounted on the main frame below the first-mentioned rock shafts and between the vertical planes of the same, a crank on said lower rock shaft arranged to swing in a transverse vertical plane of the main frame, a link connecting the last-mentioned crank with the drawbars at a point between the points of connection with the first-mentioned links, and means for setting the several rock shafts.

In testimony whereof I have signed my name to this specification.

EDWARD C. GLEDHILL.